April 26, 1966 H. K. PRICE 3,247,924
SAFETY AUTOMOBILE DOOR LOCKING DEVICE
Original Filed Aug. 31, 1962 3 Sheets-Sheet 3
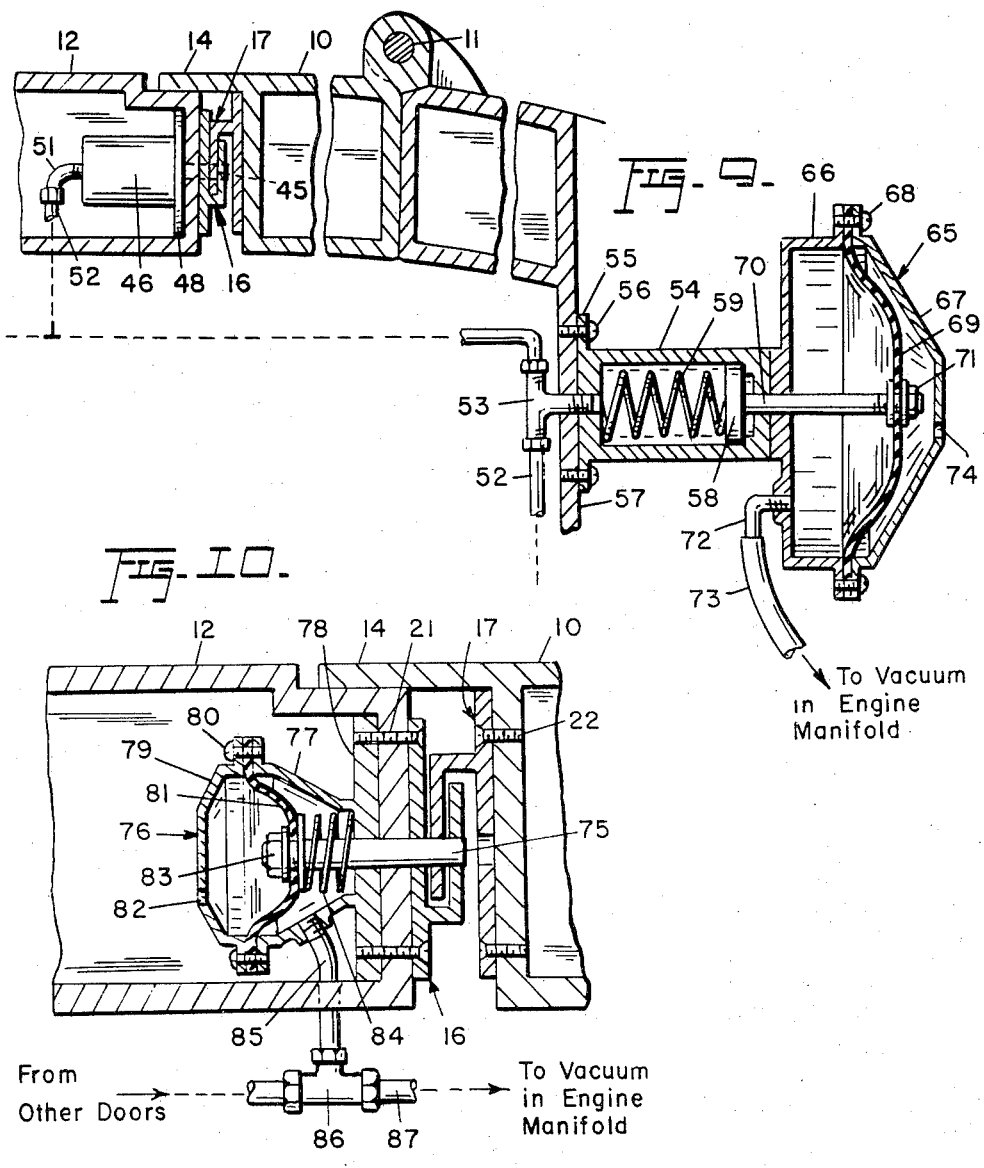
INVENTOR
HOLLAS K. PRICE
BY *Munson H. Lane*
ATTORNEY

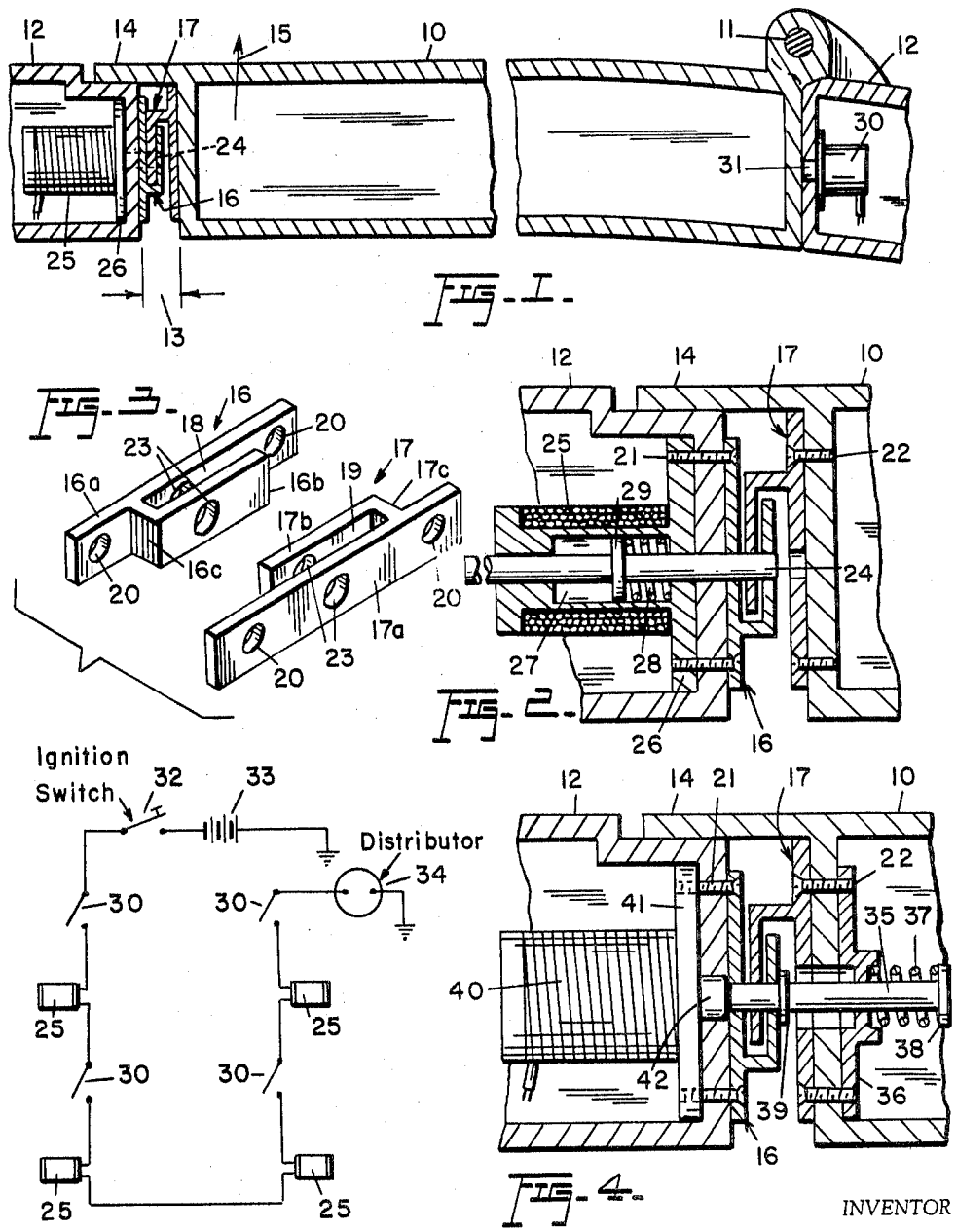

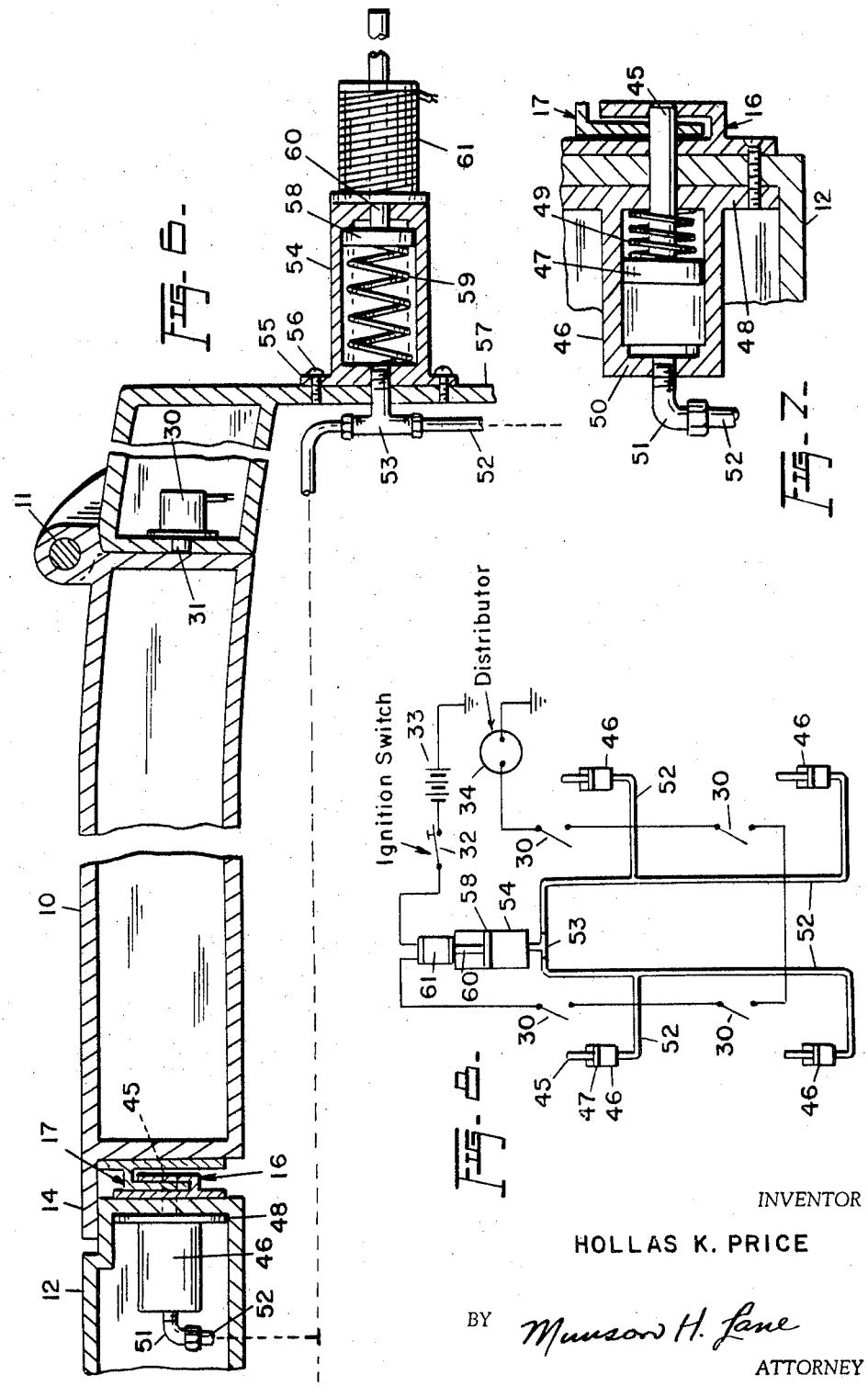

United States Patent Office 3,247,924
Patented Apr. 26, 1966

3,247,924
SAFETY AUTOMOBILE DOOR LOCKING DEVICE
Hollas K. Price, Box 701, Oak Hill, W. Va.
Original application Aug. 31, 1962, Ser. No. 220,656, now Patent No. 3,166,144, dated Jan. 19, 1965. Divided and this application Dec. 31, 1964, Ser. No. 422,622
6 Claims. (Cl. 180—82)

The present application is a division of my application Serial No. 220,656, filed August 31, 1962, and now Patent No. 3,166,144, dated January 19, 1965.

This invention relates to new and useful improvements in safety door locking devices for automotive vehicles such as automobiles, trucks, buses, and the like, and the principal object of the invention is to prevent the doors of such vehicles from being opened while the engine is running.

As such, the locking device of the invention safeguards against the possibility of persons, especially small children, from opening the doors and falling out of the vehicle while the vehicle is in motion. Also, it safeguards against the possibility of unauthorized persons opening the doors and entering the vehicle while the latter is waiting, for example, for a traffic signal to change. Moreover, in the event of an accident, the safety device safeguards against the doors springing open, which often causes the occupants of the vehicle to be ejected. In keeping with these various features, the safety device also prevents the engine from being started when all the doors are not closed.

Other advantages of the invention reside in the simple construction, efficient and dependable operation, and in its adaptability to economical manufacture and expeditious installation on new vehicles as well as those already in existence.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a fragmentary horizontal sectional view of a vehicle door frame and door, showing the safety locking device embodied therein;

FIGURE 2 is an enlarged fragmentary horizontal sectional view of the left-hand portion of FIGURE 1;

FIGURE 3 is a perspective view showing the two keeper members used in the invention;

FIGURE 4 is a sectional view, similar to that shown in FIGURE 2, but illustrating a modified embodiment of the invention;

FIGURE 5 is a wiring diagram of the electrical components, which is applicable to the embodiments of both FIGURE 2 and FIGURE 4;

FIGURE 6 is a sectional view, similar to that shown in FIGURE 1, but illustrating another modified embodiment of the invention;

FIGURE 7 is an enlarged, fragmentary sectional detail of the left-hand portion of FIGURE 6;

FIGURE 8 is a wiring diagram of the electrical components and a schematic diagram of the hydraulic components used in the embodiment of FIGURE 6;

FIGURE 9 is a sectional view, similar to those illustrated in FIGURES 1 and 6, but showing another modified embodiment of the invention; and FIGURE 10 is a fragmentary sectional view showing still another modified embodiment.

Referring now to the accompanying drawings in detail, more particularly to FIGURES 1-3, the reference numeral 10 designates the door of an automobile, or the like, the door being hinged at its inner side edge as at 11 in a door frame 12, while the outer side edge of the door is spaced away from the door frame to provide a predetermined clearance 13 for opening and closing of the door.

The outer side edge of the door is formed with the usual lip 14 which overlaps the door frame and closes the space or clearance 13 at the outside of the vehicle body, it being understood, of course, that the door 10 opens outwardly, as indicated by the arrow 15.

The safety door locking device in accordance with the invention comprises a pair of keeper members 16, 17 which are disposed in the space or clearance 13 between the door and the frame. The members 16, 17 are similar in construction, the member 16 consisting of a strap 16a and a tongue 16b which is connected at one end thereof to the strap by a connecting portion 16c so as to form an open-ended slot 18 between the strap and the tongue. Similarly, the member 17 includes a strap 17a, a tongue 17b and a connecting portion 17c, with an open-ended slot 19 between the tongue and the strap. The end portions of the straps 16a, 17a are formed with apertures 20 to receive suitable screws 21, 22, respectively, whereby the keeper members 16 and 17 are secured, respectively, to the door frame and to the door.

It will be observed that the keeper members are mounted so that the open end of the slot 18 of the member 16 is oriented outwardly while the open end of the slot 19 of the member 17 is oriented inwardly of the door, so that when the door is closed, the tongue 17b of the member 17 enters into the slot 18 of the member 16 and the tongue 16b of the member 16 enters into the slot 19 of the member 17, this interfitting of the tongues in the slots taking place in the arc of swinging of the door and the parts being so proportioned that no binding or undue friction exists.

The straps and tongues of the two members 16, 17 are also provided with aligned apertures 23 which are in register when the door is closed and slidably receive a projectable and retractable keeper pin 24. The latter may be constituted by the armature of a solenoid 25 which is equipped with a mounting flange 26 and is secured inside the door frame 12 by the screws 21. The body of the solenoid 25 is provided with a central chamber 27 through which the pin 24 extends, the chamber accommodating a coil spring 28 which bears against a shoulder 29 on the pin so as to urge the latter to its retracted position, that is, inwardly into the solenoid, in which position the outer end portion of the pin is withdrawn from the apertures 23 in the tongue 16b and the tongue 17b to permit the door to be opened. The pin 24 projects from the solenoid 25 and is long enough so that when the solenoid is energized, the pin 24 assumes a centralized position with respect to the solenoid and projects outwardly into the apertures 23 in the tongues 17b and 16b to lock the door in its closed position. If desired, the pin 24 may be long enough so that in its projected position the pin also enters the aperture 23 in the strap 17a of the member 17, although this is not essential.

The door frame 12 is provided at the hinged edge of the door 10 with a door actuated switch 30 having a door engaging plunger 31, the switch 30 being open when the door is open and closed when the door is closed. As is shown in FIGURE 5, the solenoid 25 is connected in series with the door actuated switch 30 to the ignition switch 32 of the vehicle, the ignition switch 32 being in circuit with a battery 33. A separate solenoid 25 and switch 30 are provided for each of the several doors of the vehicle, and the several solenoids and the several switches 30 are connected in series with the ignition switch 32 to the distributor 34 of the vehicle, so that when any one of the door actuated switches 30 is open, the distributor 34 cannot be energized even if the ignition switch 32 is closed. Thus, the engine of the vehicle cannot be started as long as any one of the vehicle doors is open, as will be clearly apparent.

When the engine of the vehicle is not running and the ignition switch 32 is open, all of the solenoids 25 are de-energized, and the springs 28 of the several door locking units retain the pins 24 in their retracted position, so that any or all of the doors may be opened and closed as desired. However, when the ignition switch is closed and the engine is running, all of the solenoids 25 will become energized, thus projecting the pins 24 and locking all of the doors in their closed position, so that intentional, accidental or unauthorized opening of the doors cannot be effected.

FIGURE 4 illustrates a modified embodiment of the invention wherein the projectable and retractable keeper pin 35 is disposed in the door rather than in the door frame, being slidably held in a mounting bracket 36 which is secured in the door by the screws 22. The bracket 36 also forms a seat for a coil spring 37 which bears against a head 38 provided on the inner end of the pin, thus biasing the pin to its retracted position. A shoulder 39 is formed intermediate the ends of the pin 35 and is engageable with the bracket 36 to limit the extent of inward sliding of the pin under the action of the spring 37. When the pin 35 is projected, its outer end portion enters the apertures 23 in the tongues 17b, 16b and also in the strap 16a of the member 16, so as to keep the door locked. The sliding of the pin to its projected position is effected by the pull of an electro-magnet 40 which is equipped with a mounting flange 41 and is secured in the door frame by the screws 21. The electro-magnet 40 has a pole piece 42 which causes the pin 35 to be attracted thereto when the magnet is energized. The several electro-magnets 40 of the several door locking units are connected in series with the door switches 30, as already described in connection with the solenoids 25.

It is to be particularly noted in connection with both embodiments of the invention that the interfitting arrangement of the tongues 16b, 17b and slots 18, 19 safeguards against possible springing or pulling of the door from the door frame or vice versa, such as often happens during accidents with the result that the doors' swing open and occupants of the vehicle are ejected. This interfitting arrangement of the tongues and slots serves to retain the aforementioned space or clearance 13 at a fixed dimension, so that the conventional door locks of the vehicle do not become unlatched by relative springing of pulling away of the door and frame. It is understood, of course, that the door locking devices of the invention are used in addition to conventional door locks with which the vehicle is equipped.

FIGURES 6–8 illustrate another modified embodiment of the invention wherein hydraulic means are utilized for projecting the keeper pin of the locking device, in place of a solenoid or an electro-magnet, as already described. In this modified arrangement the keeper pin 45 which cooperates with the keeper members 16, 17 extends into a hydraulic cylinder 46 and carries a piston 47 which is slidable in the cylinder. The cylinder 46 is provided with a mounting flange 48, whereby it is secured in the door frame 12 by the screws 21. A coil spring 49 is provided in the cylinder 46 between the piston 47 and the flange 48, for urging the pin 45 to its retracted position. The end wall 50 of the cylinder is apertured to receive a fitting 51 having a hydraulic line 52 connected thereto, whereby hydraulic fluid under pressure may be admitted into the cylinder for acting upon the piston 47 to slide the pin 45 to its projected position, against the action of the spring 49.

As is illustrated in FIGURE 8, the hydraulic lines 52 of the several cylinders 46 of the several vehicle doors are connected in parallel to a T-fitting 53 which is threaded into one end of a master cylinder 54, the latter having a flange 55 whereby it may be mounted by suitable screws 56, for example, on the usual bulkhead or firewall 57 which separates the interior of the vehicle from the engine compartment.

The master cylinder 54 contains a slidable piston 58, biased by a spring 59 and having a piston rod 60 which is constituted by a reciprocable armature of an electromagnet or solenoid 61. The solenoid 61 is suitably secured to the adjacent end of the master cylinder 54, as will be clearly apparent. The winding of the solenoid 61 is connected in series with the switches 30 and the ignition switch 32 to the battery 33 and distributor 34, as shown in FIGURE 8. A suitable reservoir (not shown) may be provided to maintain the hydraulic system full of fluid at all times.

When the ignition switch 32 is open, the solenoid 61 is not energized and the spring 59 maintains the piston 58 at the end of the master cylinder adjacent the solenoid, while the keeper pins 45 of the several door cylinders 46 are retracted by the springs 49 in the door cylinders, so that the doors may be opened and closed as desired. Also, with any one of the doors left open, the appropriate of the door actuated switches 30 will prevent the vehicle engine from starting, even if the ignition switch 32 is closed. However, when all the doors are closed, closing of the ignition switch 32 will energize the solenoid 61, causing the armature 60 thereof to assume a centralized position with respect to the solenoid, thereby sliding the piston 58 in the master cylinder 54 against the action of the spring 59, and fluid under pressure of the piston will be transmitted through the lines 52 to the various door cylinders 46, thus causing the pins 45 to be projected for locking the doors.

FIGURE 9 illustrates another modified embodiment of the invention wherein a hydraulic cylinder 46 is utilized for projecting the keeper pin 45 of the locking device in the same manner as in the embodiment of FIGURE 6, the cylinder 46 being actuated by fluid pressure from the master cylinder 54 as already described. However, this embodiment employs a vacuum operator 65 for actuating the master cylinder 54, in place of the solenoid 61 used in the embodiment of FIGURE 6.

The vacuum operator 65 comprises a suitable housing 66 which is conveniently attached to the master cylinder and is provided with a cover 67, secured to the housing by a plurality of screws 68. A flexible diaphragm 69 has its marginal edge portion secured by the screws 68 between the housing and the cover, and the piston rod 70 of the master cylinder piston 58 is connected to the diaphragm 69 as at 71. A fitting 72 communicates with the interior of the housing 66 and a hose 73 extends from the fitting 72 to the engine manifold (not shown), so that when the engine is in operation, sub-atmospheric pressure existing in the engine manifold will create a vacuum in the housing 66 and atmospheric pressure entering through an air passage 74 in the cover 67 will deflect the diaphragm 69 so as to slide the piston rod 70 inwardly into the master cylinder 54 and pressure exerted by the piston 58 on the fluid in the hydraulic system will actuate the several hydraulic cylinders 46 to lock the several doors. Of course, when the engine is stopped, the master cylinder spring 59 will return the diaphragm 69 to its initial position, while air from inside the cover 67 is exhausted through the passage 74.

In this embodiment of the invention no electrical components are involved and accordingly, the door actuated switches 30 and their associated wiring are not necessary, although they may nevertheless be provided for breaking the electric circuit through the ignition switch so that the engine cannot be started when any of the doors are open.

FIGURE 10 illustrates another modified embodiment which, like that of FIGURE 9, is responsive to vacuum in the engine manifold. However, in this embodiment the hydraulic system (cylinders 46, 54 and associated conduits) are not employed and the keeper pin 75 of each door locking device is slid to its projected or locking position by an associated vacuum operator 76. In other words, a vacuum operator 76 is used for the locking device on each door in place of the hydraulic cylinder 46 used in the embodiments of FIGURES 6 and 9.

The vacuum operator 76 comprises a housing 77 having a mounting flange 78 which is secured in the door frame 12 by the screws 21. The housing 77 has a cover 79 secured thereto by a plurality of screws 80, which also serve to clamp the marginal edge portion of a flexible diaphragm 81 between the housing and the cover. The cover 79 is provided with an air vent or passage 82 communicating with the atmosphere, and the keeper pin 75 of the locking device is connected to the diaphragm 81 as at 83. A compression spring 84 is provided in the housing 77 to bias the diaphragm 81 to a position wherein the keeper pin 75 is retracted from the keeper members 16, 17, that is, to an unlocked position of the pin. A fitting 85 communicates with the interior of the housing 77 and is connected by a T 86, or the like, to a vacuum line 87 which extends from the engine manifold to the vacuum operators 76 of the several doors. Thus, when the engine is in operation and vacuum is created in the housing 77, the diaphragm 81 will be deflected to the illustrated position wherein the pin 75 is projected to lock the door. When the engine is stopped, the spring 84 will automatically return the pin 75 to its retracted position.

In the last described embodiment of the invention the use of the door actuated switches 30 also is not necessary, although they may be provided, if desired, to interrupt the circuit through the ignition switch and thus prevent the engine from being started when any of the doors are open.

While in the foregoing there have been described and shown the preferred embodiments of the invention, various other modifications may become apparent to those skilled in the art to which the invention relates. Accordingly, it is not desired to limit the invention to this disclosure, and various modifications and equivalents may be resorted to, falling within the spirit and scope of the invention as claimed.

I claim:

1. In an automotive vehicle, the combination of a door frame, a door, and a safety door locking device comprising a pair of similarly constructed keeper members interposed between said frame and said door and secured respectively thereto in reversely oriented position, each of said keeper members comprising a strap, a tongue parallel with but spaced from said strap, and an offset portion connecting one end of said tongue to said strap, the space between said tongue and the strap constituting a slot open at the end of the tongue remote from said offset portion, the tongue of one of said keeper members being received in the slot of the other keeper member when the door is closed, the straps and the tongues of the keeper members being provided with aligned apertures having axes which intersect the slots thereof and which are in register in the closed position of the door, a projectable and retractable keeper pin slidable in the registering apertures for locking the door in its closed position when said pin is projected, resilient means for urging said pin to its retracted position, and power-operated means for projecting said pin against the action of said resilient means, said last mentioned means including an electro-magnet mounted in said door frame for sliding said pin to its projected position.

2. The combination as defined in claim 1 wherein said pin is retractable into said door frame and is constituted by an end portion of said armature of said electro-magnet.

3. The combination as defined in claim 1 wherein said pin is retractable into said door, said electro-magnet having a pole piece aligned with said pin for attracting and sliding the pin to its projected position when the electro-magnet is energized.

4. The combination as defined in claim 1 wherein said vehicle also includes an ignition switch, said electro-magnet being in circuit with said switch and with a source of current for energizing the electro-magnet when the ignition switch is closed.

5. The combination as defined in claim 4 together with a door actuated switch connected in series with said electro-magnet to said ignition switch, said door actuated switch being open and closed when the door is opened and closed respectively.

6. The combination as defined in claim 4 wherein said automobile also includes a distributor, said electro-magnet and said door actuated switch and said ignition switch being connected in series with said distributor to said source of current.

References Cited by the Examiner

UNITED STATES PATENTS

| | | | |
|---|---|---|---|
| 973,001 | 10/1910 | Churchill | 292—340 |
| 1,192,733 | 7/1916 | Bennett | 292—302 X |
| 2,110,125 | 3/1938 | Galloway | 180—82 |
| 2,198,862 | 4/1940 | Chesler | 180—82 |
| 2,530,628 | 11/1950 | Pivero. | |
| 2,672,943 | 3/1954 | Chatlynne et al. | 180—82 |
| 2,758,864 | 8/1956 | Dixon | 292—341.15 X |
| 2,876,856 | 3/1959 | Greene | 180—82 |
| 3,124,950 | 3/1964 | Nallinger | 180—82 |
| 3,166,144 | 1/1965 | Price | 180—82 |

BENJAMIN HERSH, *Primary Examiner.*

A. HARRY LEVY, *Examiner.*